United States Patent [19]

Hahn et al.

[11] 3,946,412

[45] Mar. 23, 1976

[54] PHOTOGRAPHIC CAMERA HAVING ELECTRIC MOTOR DRIVE FOR SHUTTER COCKING AND FILM WINDING

[75] Inventors: Werner Hahn; Herbert Scholze; Rolf Seifert, all of Dresden, Germany

[73] Assignee: Veb Pentacon Dresden, Dresden, Germany

[22] Filed: July 22, 1974

[21] Appl. No.: 490,720

[30] Foreign Application Priority Data

Aug. 29, 1973  Germany.............................. 173137

[52] U.S. Cl. .............................................. 354/204
[51] Int. Cl.² ........................................... G03B 17/00
[58] Field of Search ..................................... 354/204

[56] References Cited
UNITED STATES PATENTS 3,587,998   6/1971   Kuramoto ...................... 354/204 X

*Primary Examiner*—Richard M. Sheer
*Attorney, Agent, or Firm*—William Anthony Drucker

[57] ABSTRACT

A photographic camera having a mirror gearing and an electric motor for shutter cocking and film winding, in which the current connection for the electric motor situated in the camera housing is controlled alternately by the shutter and film winding.

The camera includes a manual release mechanism and a remote release mechanism. A detent disc is mounted on a shaft and driven by the electric motor. A release lever is also mounted on the shaft. A first blocking lever is provided for inhibiting the movement of the release lever and is connectable both with the manual release and the remote release. A second blocking lever also inhibits the movement of the release lever. A detent lever with a nose thereon engages the detent disc and is connected through a joint with the second blocking lever. An actuator lever is provided for releasing the detent lever from the detent disc and is blockable by a blocking pawl coupled with the mirror gearing. A dog is driven by the motor for tensioning the actuator lever. The motor drives the detent disc causing the release lever to be held under tension by the first and second blocking levers. When the cocking cycle is completed the detent lever drops into the detent disc and releases the second blocking lever, the motor being simultaneously switched off. On actuation of the release the first blocking lever is moved liberating the release lever which activates the mirror gearing and the shutter. After release of the shutter the mirror gearing actuates the blocking pawl which releases the detent lever from the detent disc causing the motor to operate and recock the release lever.

4 Claims, 1 Drawing Figure

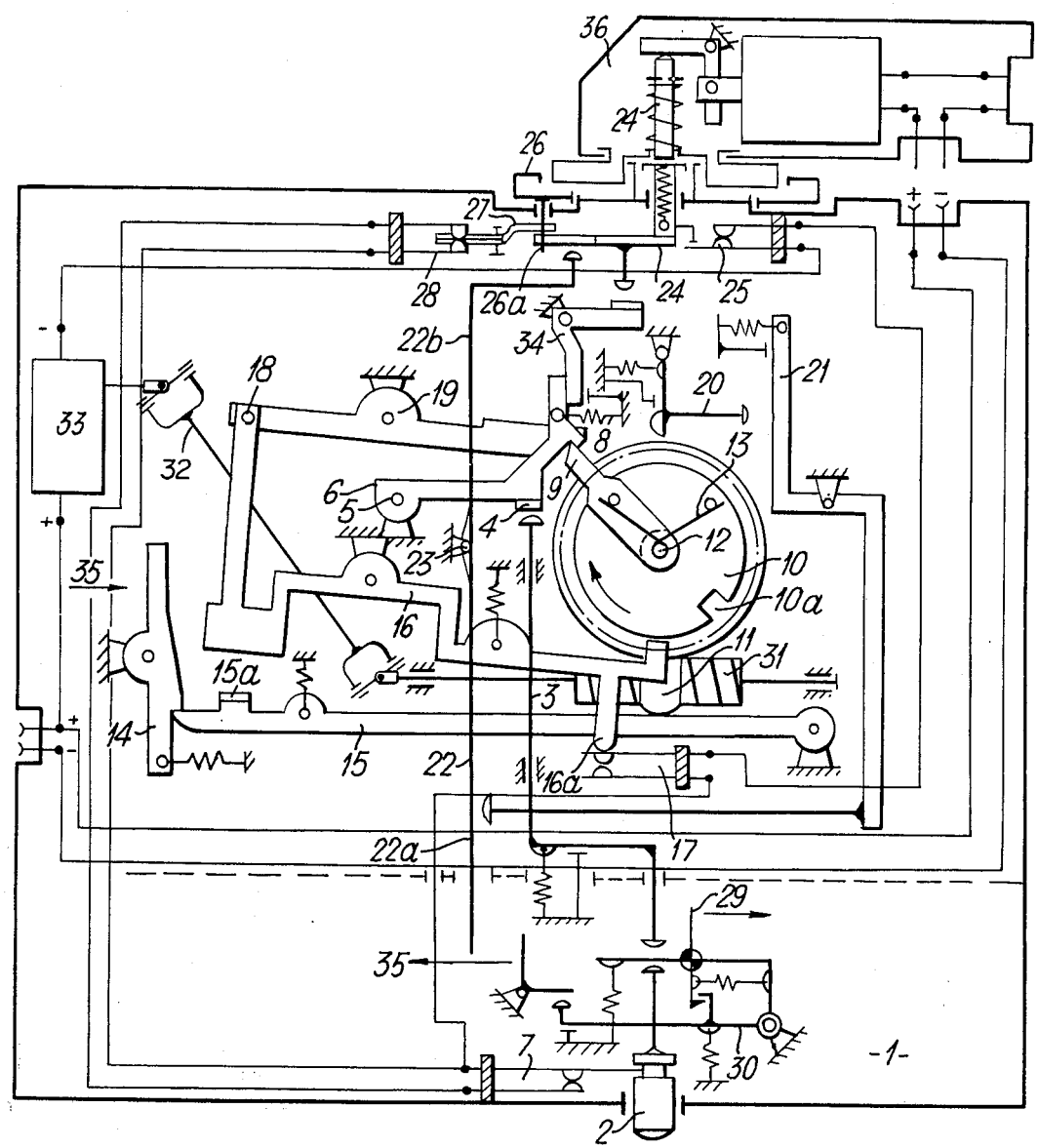

PHOTOGRAPHIC CAMERA HAVING ELECTRIC MOTOR DRIVE FOR SHUTTER COCKING AND FILM WINDING

BACKGROUND TO THE INVENTION

The invention relates to a photographic camera having a built-in electric motor which apart from film winding carries out at the same time a cocking of the shutter and possibly further actions preparing the readiness for picture-taking.

Such cameras are already known.

In one known form of embodiment (Ger. Pub. Spec. No. 1,027.981 – 57a, 25/01) it was proposed in order to reduce the camera dimensions to accommodate an electric motor in the interior of the film-take-up spool of photographic cameras. In this case the housing of the electric motor was rotatably mounted and formed as film take-up spool, which is driven by the rotor shaft of the electric motor through a reduction gearing. However this apparatus has the disadvantage that due to the necessary arrangement of slip rings and slip contacts, constant resistances can occur in the case of slight use which can result in functional incapacity of the motor. Another apparatus which has become known (East German Pat. No. 27,678 – 57a 25/01) eliminates this disadvantage in that it forms the return ring of the electric motor as film take-up spool, arranges this rotatably about a fixed stator and connects it by gearing through a reduction gear with the rotor of the electric motor.

Thus good exploitation of space is achieved with simultaneous economical production of the electric motor.

Despite the indicated advantages, the apparatus is trouble-prone and expensive in production as a result of the high gearing expenditure. The prior art also includes cameras with electric motor drive which can be set in action by a release fitted on the drive mechanism, whereby serial shots are possible. The camera release itself serves in a manner known per se for the instigation of a single-frame exposure. It is admittedly also possible to make a single exposure by means of the switch for serial exposures. The drive mechanism release however in this case must be depressed only for a short time.

In another known apparatus this disadvantage is eliminated in that even in the case of instigation of a single frame exposure on the camera, the film winding and shutter cocking take place from the drive mechanism after the exposure. The switching on of the drive mechanism takes place automatically after liberation of the release. In this case the release must be pressed until the desired exposure time is reached.

According to a further apparatus this drawback is eliminated in that a drive mechanism switch is provided which can be transferred into at least two positions. In this case in the one position on actuation a series of exposures is instigated according to the duration of the actuation and in the other position only a single shutter release is effected irrespective of the duration of actuation with subsequent shutter cocking.

The releasae device is connected with the release on the camera in such a way that on actuation of the release and switch device — whether in the E (single) or the S serial position — the release of the shutter takes place through the release mechanism situated on the camera. The film winding and shutter cocking are however initiated from the drive mechanism. Conversely in the case of release directly on the camera the switch device on the drive mechanism remains unaffected, so that then the film winding and shutter cocking are also indpendent of the drive mechanism.

However it then makes itself disadvantageously noticeable that the cocking lever must still be actuated by hand in the case of direct release on the camera.

Moreover due to the attachable motor cocking, the apparatus as described cannot be regarded as a constructional unit, which has disadvantageous effects upon the construction height. The invention is therefore based upon the problem of rendering possible either single or serial exposures with all exposure times — except B in the case of series — while release can take place either on the camera release or on the remote release and the cocking of the shutter and the winding of the film can be effected in both cases by the motor.

Moreover a lower construction height and simple operation are to be achieved.

SUMMARY OF THE INVENTION

According to the invention this aim is achieved in that a dog connected with a storage lever is associated with a detent disc mounted on a shaft, the storage lever being blockable by a pawl coupled with the mirror gearing and a release lever, the running off of which can be inhibited by at least two blocking levers, being mounted on the shaft of the detent disc, of which one blocking lever is connected both with a manual release and with a remote release and the other blocking lever is connected through a joint with a detent lever which can engage by means of a nose in the detent disc.

The invention further provides that the release lever is connected with the detent disc through a force storage means and with the detent disc there is associated a worm gearing which is connected through a Cardan shaft with the drive motor.

In further development of the invention the storage lever is connected with the detent lever through a nose.

The invention will be explained hereinafter by way of example with reference to an embodiment which is illustrated in the drawing.

DESCRIPTION OF A PREFERRED EMBODIMENT

A manual release 2 secured in a camera housing 1 is connected through a displaceably mounted angle lever 3 with a nose 4 of a first blocking lever 6 which is pivotable about a stationary pivot point 5. A switch 7 in series with a shutter cocking and film winding motor 33 here extends into the path of movement of the manual release 2.

The blocking lever 6 is held by means of a spring 8 in a position blocking a release lever 9. The release lever 9 is mounted with a detent disc 10 on a shaft 12. The detent disc 10, which is provided with a toothed rim, and the release lever 9 are here interconnected through a spring 13.

A dog 11 is connected with a spring-driven storage lever 15 held by a blocking pawl 14. The storage lever 15 is coupled through its nose 15a with a detent lever 16. The detent lever 16 can engage in a groove 10a of the detent disc 10 and is connected through its nose 16a with a switch 17. A second blocking lever 19 is directly geared with the detent lever 16 through a joint 18. The second blocking lever 19 engages with the release lever 9 in the same manner as the first blocking lever 6.

A spring-driven operating lever 20, which is connectable with an intermediate lever 21, extends into the pivoting range of the release lever 9.

A two-armed shutter-operating lever 22 is mounted pivotably about a stationary pivot point 23. One arm 22a connects with the intermediate lever 21 and the other arm 22b with a release plunger 24 of an attachable magnetic release 36. Moreover an arm of a switch 25 extends into the region of movement of the release plunger 24.

A setting member 26 engages with its nose 26a both in a switch fork 27 of a switch 28 (which is in parallel with the switch 7) and in an intermediate member (not shown further) which is coupled with a retaining pawl 29. The retaining pawl 29 is locked with an angle lever 30.

With the toothed detent disc 10 there is associated a gearing 31 which is connected through a Cardan shaft 32 and a coupling with the drive motor 33.

The manner of operation of the apparatus according to the invention is as follows:

a. Cocking procedure

The setting member 26 for single-frame or serial shots is brought into the position as illustrated, this being the "S" or serial position. Simultaneously with the rotation of the setting member 26 into this position the release plunger 24 is rotated about its axis so that the shutter-operating lever 22 comes to lie outside the range of movement of the release plunger 24 and the switch 25 cannot be opened by the release movement of the release plunger 24. Moreover the switch 28 is closed and the locking between the retaining pawl 29 and the angle lever 30 is released. Motor 33 drives the detent disc via the shaft 32 and gearing 31 and Cocking is terminated when the detent lever 16 drops into the groove 10a of the detent disc 10 and the blocking lever 19 liberates the release lever 9, which is initially stressed during the cocking operation, this lever 9 however being held in its cocked position at the same time also by the blocking lever 6.

On engagement of the detent lever 16 in the groove 10a of the detent disc 10 as described above, the motor current is interrupted at the same time by opening of the switch 17 by means of the movement of nose 16a of the detent lever 16.

b. Serial shots by hand manual release:

The switch 7 is opened by actuation of the manual release 2 on the camera. The movement is conducted through the retaining pawl 29, separated from the angle lever 30, and through the angle lever 3 as far as the blocking lever 6 which liberates the initially stressed release lever 9. The release lever 9 strikes against the operating lever 20 which actuates the intermediate lever 21. The latter then moves the shutter-operating lever 22 which releases the shutter through the mirror gearing 35 of the camera (not shown in detail). The circular paths of the release lever 9 and of the operating lever 20 then intersect, so that the release lever 9 disengages the operating lever 20 and the latter is withdrawn into its initial position by a spring secured to it, after release has taken place.

After the actuating operation a mechanical pulse from the returning mirror gearing 35 releases the blocking pawl 14, which liberates the storage lever 15 which was stressed by the dog 11 during the preceding cocking. This lever strikes the detent lever 16 out of the detent disc 10. The switch 17 is then closed by the nose 16a of the detent lever 16 completing the motor circuit. The detent disc 10 driven by the motor rotates in the clockwise direction until the detent lever 16 drops into the groove 10a of the detent disc 10 again. Thus the motor current circuit is again interrupted through the switch 17 recocking is completed.

During re-cocking the storage lever 15 was again stressed by the dog 11. At the moment when the detent lever 16 drops into the groove 10a of the detent disc 10, the release lever 9, which is inhibited during re-cocking by the blocking lever 19, is liberated and strikes against the operating lever 20, which again initiates the exposure operation if the manual release 2 is kept pressed and thus the blocking lever 6 is out of engagement, so that the release lever 9 is not hindered by this lever in the subsequent releases.

So that the motor current circuit is not interrupted by the switch 7 due to the constant depression of the manual release 2, the switch 28 is connected in parallel with the switch 7.

c. Serial shots by remote release:

The attached magnetic release 36 unlocks the initially stressed release lever 9 through the release plunger 24, the angle lever 34 and the blocking lever 6. The remaining operating sequence is as described for manual release above.

d. Single-frame exposures and B:

The setting member 26 for single-frame or serial shots is brought into the position "single". Thus the switch 28 is opened via fork 27 and the shutter-operating lever 22 is brought into engagement with the release plunger 24 and the latter with the switch 25. Moreover the locking between the retaining pawl 29 and the angle 30 is restored.

The remaining operation sequence correspond to the first release of the actions as described under "Serial shots by hand."

The motor current circuit remains interrupted, despite the closure of the switch 17, until the manual release 2 or the release plunger 24 returns into the initial position and thus the switches 7 and 25 are closed.

We claim:

1. In a photographic camera having a mirror gearing and an electric motor for shutter cocking and film winding, in which the current connection for the electric motor situated in the camera housing is controlled alternately by the shutter and film winding, the provision of:
   a. a manual release mechanism;
   b. a remote release mechanism;
   c. a shaft;
   d. a detent disc mounted on said shaft and driven by said electric motor;
   e. a release lever mounted on said shaft;
   f. a first blocking lever for inhibiting the movement of said release lever and connectable both with said manual release and said remote release;
   g. a second blocking lever for inhibiting the movement of said release lever;
   h. a detent lever with a nose thereon for engaging said detent disc and connected through a joint with said second blocking lever;
   i. a blocking pawl coupled with said mirror gearing;
   j. an actuator lever for releasing said detent lever from said detent disc and blockable by said blocking pawl;

k. a dog driven by said motor for tensioning said actuator lever.

2. The photographic camera of claim 1, wherein the release lever is connected with the detent disc through a force-storage means.

3. The photographic camera of claim 1, wherein with the detent disc there is associated a gearing which is connected through a Cardan shaft with the electric motor.

4. The photographic camera of claim 1, wherein the actuator lever is connected through a nose thereof with the detent lever.

* * * * *